US012557903B2

(12) United States Patent
Zieger

(10) Patent No.: US 12,557,903 B2
(45) Date of Patent: Feb. 24, 2026

(54) INTERCHANGEABLE-TOOL MACHINE INTERFACE FOR A CLEANING BRUSH

(71) Applicant: Robert Bosch GmbH, Stuttgart (DE)

(72) Inventor: Jens Zieger, Altbach (DE)

(73) Assignee: Robert Bosch GmbH, Stuttgart (DE)

( * ) Notice: Subject to any disclaimer, the term of this patent is extended or adjusted under 35 U.S.C. 154(b) by 854 days.

(21) Appl. No.: 17/817,586

(22) Filed: Aug. 4, 2022

(65) Prior Publication Data

US 2023/0058414 A1     Feb. 23, 2023

(30) Foreign Application Priority Data

Aug. 18, 2021    (DE) ..................... 20 2021 104 423.3
Aug. 18, 2021    (DE) ..................... 20 2021 104 424.1

(51) Int. Cl.
| | |
|---|---|
| *A46B 13/02* | (2006.01) |
| *A46B 5/00* | (2006.01) |
| *A46B 9/00* | (2006.01) |
| *A46B 13/00* | (2006.01) |
| *B25G 3/00* | (2006.01) |
| *B25G 3/18* | (2006.01) |
| *F16B 21/07* | (2006.01) |

(52) U.S. Cl.
CPC ............ *A46B 13/02* (2013.01); *A46B 5/0095* (2013.01); *A46B 9/005* (2013.01); *A46B 13/008* (2013.01); *B25G 3/00* (2013.01); *B25G 3/18* (2013.01); *F16B 21/073* (2013.01); *A46B 2200/3033* (2013.01)

(58) Field of Classification Search
CPC ........ F16B 21/073; F16B 21/086; B25G 3/18; A46B 13/008; A46B 13/02; A46B 5/0095; A46B 7/042; A46B 2200/3033
See application file for complete search history.

(56) References Cited

U.S. PATENT DOCUMENTS

| | | | | |
|---|---|---|---|---|
| 9,579,250 | B2 * | 2/2017 | Nichols ................ | A46B 13/008 |
| 9,642,768 | B2 * | 5/2017 | Ungemach ......... | A61H 23/0254 |
| D801,702 | S * | 11/2017 | Rennette ........................ | D4/138 |
| 10,531,729 | B1 * | 1/2020 | Liu ......................... | A46B 7/042 |
| 10,602,835 | B2 * | 3/2020 | Rennette ................ | A46B 9/023 |
| 10,966,514 | B2 * | 4/2021 | Goldberg ............. | A46B 13/008 |
| 2018/0220783 | A1 * | 8/2018 | Luu ....................... | A46B 5/0054 |

FOREIGN PATENT DOCUMENTS

FR            2 740 841 B1 * 11/1995   ............... F16B 7/04

* cited by examiner

*Primary Examiner* — Michael P Ferguson
(74) *Attorney, Agent, or Firm* — Maginot, Moore & Beck LLP

(57) ABSTRACT

An interchangeable-tool machine interface for a cleaning brush, includes a drive interface and output interface that are separable and connectable without tools and are separable or connectable in several discrete angular positions by axial displacement along a common axis of rotation. The output interface has centering walls and resiliently displaceable latching-means walls, the centering walls and the resiliently displaceable latching means walls are arranged so as to be angularly offset from one another in the circumferential direction about the axis of rotation. The drive interface has centering and mating latching-means walls that are arranged so as to be angularly offset from one another in the circumferential direction about the axis of rotation and, per wall, are designed to correspond both to the centering walls and to the latching means walls of the output interface.

14 Claims, 9 Drawing Sheets

INTERCHANGEABLE-TOOL MACHINE INTERFACE FOR A CLEANING BRUSH

This application claims priority under 35 U.S.C. § 119 to application no. DE 20 2021 104 423.3 and to application no. DE 20 2021 104 424.1, both of which were filed on Aug. 18, 2021 in Germany, the disclosures of which are incorporated herein by reference in their entirety.

BACKGROUND

Interchangeable-tool machine interfaces are already known.

SUMMARY

The disclosure proceeds from an interchangeable-tool machine interface for a cleaning brush or household cleaning brush, in particular for the tool-free connection of a drive unit, preferably a motor-driven cleaning-brush drive unit, to an output unit, preferably a cleaning-brush attachment, comprising a drive interface and output interface that are separable and connectable without tools and are separable or connectable in several discrete angular positions by axial displacement along a common axis of rotation, wherein the output interface has centering walls and resiliently displaceable latching-means walls, wherein the centering walls and the resiliently displaceable latching means walls are arranged so as to be angularly offset from one another in the circumferential direction about the axis of rotation. In particular, the output interface has in each case two, or a higher even number of, centering walls and resiliently displaceable latching-means walls. The centering walls and resiliently displaceable latching-means walls are advantageously formed separately from one another. In particular, the centering walls and resiliently displaceable latching-means walls are not connected together or are at least only partially connected together parallel to the direction of the axis of rotation, or in the circumferential direction. Advantageously, they are not connected on five sides and are connected together only via a sixth side on a basic body.

It is proposed that the drive interface has centering and mating latching-means walls that are arranged so as to be angularly offset from one another in the circumferential direction about the axis of rotation and, per wall, are designed to correspond both to the centering walls and to the latching-means walls of the output interface. In principle, it is conversely possible for the centering and mating latching-means walls to of course also be arranged on the output interface and for the centering walls and resiliently displaceable latching-means walls to also be arranged on the drive interface, and a person skilled in the art will likewise consider this to be covered by the disclosure by reversing the definition of the drive interface and output interface. The drive interface and output interface are intended to be connectable by latching and are provided for torque transmission. The latching connection is releasable in particular by exceeding a force threshold. The centering walls and the resiliently displaceable latching-means walls of the drive interface and the centering and mating latching-means walls of the output interface are advantageously formed in a substantially straight manner. Thus, the drive interface and output interface can be connected in at least twice as many angular positions as the output interface has resiliently displaceable latching-means walls. This increases comfort for the user. More intuitive use is allowed. Wearing down of the drive interface or wear to the drive interface and output interface is delayed, and a useful life of the tool changing interface is lengthened.

It is proposed that the centering walls, the resiliently displaceable latching-means walls, and the centering and mating latching-means walls are each in the form of wall pairs that are mirror-symmetric to one another. The centering walls, the resiliently displaceable latching-means walls, and the centering and mating latching-means walls thus each have an identical shape or geometry and are each arranged mirror-symmetrically to one another.

It is proposed that the centering walls of the output interface have a different shape or geometry than the resiliently displaceable latching-means walls of the output interface. As a result, the walls are each functionally optimized. In particular, the centering walls are designed for positioning the drive interface and/or for torque transmission to the drive interface. In particular, the resiliently displaceable latching-means walls are designed to latch with the drive interface.

It is proposed that all the centering and mating latching-means walls of the drive interface are designed for positioning, for torque transmission and for latching with the output interface. As a result, both centering walls and latching-means walls of the output interface can be received on a centering and mating latching-means wall. The coupling capability of the drive interface and output interface is increased, in particular doubled. It is proposed that all the centering and mating latching-means walls of the drive interface have the same shape or geometry and are arranged only in an angularly offset manner with respect to one another, in particular in an angularly offset manner at the same angle to one another, in particular centering and mating latching-means walls that are adjacent in the circumferential direction are at right angles to one another or an even angular fraction of 360°, i.e. in particular 90°, 60°, 45°, 36°, 30°, etc.

It is proposed that the order of rotational symmetry of the drive interface about its axis of rotation is at least twice the order of rotational symmetry of the output interface about its axis of rotation, in particular wherein the drive interface exhibits four-fold rotational symmetry and the output interface exhibits two-fold rotational symmetry. The order of rotational symmetry of the drive interface is advantageously an even multiple of the order of rotational symmetry of the output interface. In particular, the order of rotational symmetry of the drive interface is 4-, 6-, 8- or 10-fold. This allows the drive interface and output interface to be connected in 4, 6, 8 or 10 angular positions rather than for example only two angular positions when the order of rotational symmetry of the drive interface and output interface is identical. As a result, at the same time, a very secure hold and/or high-torque connection can be realized. The comfort for the user is increased.

It is proposed that the centering and latching-means walls of the output interface and the centering and mating latching-means walls of the drive interface are arranged at the same angle to one another in the circumferential direction, in particular at the same square, hexagonal, octagonal or even-polygonal angle. In other words, the centering walls are arranged at the same angle relative to the latching-means walls and the centering and mating latching-means walls are arranged at the same angle to one another, advantageously at right angles.

It is proposed that the output interface has, with regard to the axis of rotation, torque-transmission walls that are offset toward the inside or in particular toward the outside parallel to the centering walls. Inside or outside should be understood here as meaning in particular radially toward the inside or outside relative to the axis of rotation. Advantageously, as a result, a receiving gap for the centering and mating latching-means walls of the drive interface is provided. Advantageously, torque transmission takes place primarily between an outer face of the centering and mating latching-means walls of the drive interface and an inner face of the torque transmission walls of the output interface. Advantageously, centering and/or latching takes place primarily at or via an outer face of the latching-means walls of the output interface and an inner face of the centering and mating latching-means walls of the drive interface.

It is proposed that the axis of rotation extends along a section line of two planes of mirror symmetry oriented at right angles to one another, wherein the drive interface and output interface each have a first and, at right angles thereto, a second pair of mutually opposite walls that are arranged mirror-symmetrically to the first and second plane of mirror symmetry, respectively, in particular wall portions that protrude axially freely in the direction of the axis of rotation starting from a respective basic body of the drive interface and output interface. The pair of first wall portions and the pair of second wall portions or pairs of further wall portions of the drive interface and output interface are advantageously arranged at the same angle to one another in the circumferential direction. The pair of first wall portions and the pair of second wall portions or pairs of further wall portions of the drive interface have an identical shape, in particular are each designed for torque transmission and for latching with the output interface. The pair of first wall portions advantageously has a different shape than the pair of second wall portions or the pair of further wall portions of the output interface, being either designed for torque transmission or designed for latching with the drive interface. For the axial securing or latching of the drive interface and output interface, the drive interface has latching means, in particular latching recesses in the pairs of first and second or further wall portions and the output interface has a pair, in particular the second pair, of tab-like wall portions with mating latching means, in particular latching protrusions, preferably latching protrusions arranged at free ends of the tab-like wall portions. Advantageously, the drive interface or output interface, in particular the output interface, has at least a third pair of wall portions that are mirror-symmetrically opposite one another, this pair having, with regard to the axis of rotation, a parallel offset toward the inside or outside with respect to the wall portions of the first pair, in particular with the result that a receiving gap, in particular for the wall portions of the drive interface, arises between the parallel-offset first and third wall portions.

Also proposed is an attachment, in particular a cleaning-brush attachment, cleaning-sponge attachment, cleaning-sponge receptacle attachment or scourer attachment, having a drive interface or output interface as part of an abovementioned interchangeable-tool machine interface.

A hand-held power tool, in particular comprising a cleaning-brush drive unit and a cleaning-brush attachment, having an abovementioned interchangeable-tool machine interface is proposed.

Also proposed is an electric-motor-driven household cleaning brush or cleaning brush, having a housing unit for the in particular sealed accommodation of at least one drive unit, in particular of an electric motor, a transmission unit, an open-loop or closed-loop control unit and a rechargeable-battery unit. The housing unit has a handle housing portion accommodating the open-loop or closed-loop control unit and the rechargeable-battery unit, in particular having an actuating switch, arranged on a top side of the handle housing portion, for activating the household cleaning brush. It has preferably a charging interface, arranged on the underside of the handle housing portion, in particular in the region of a free end of the handle housing portion, for charging the rechargeable battery unit. Arranged at an obtuse angle to the handle housing portion is a motor transmission housing portion accommodating the drive unit and transmission unit, wherein the motor transmission housing portion receives, at its free end, an in particular sealed and rotatably mounted drive interface, on which a cleaning brush attachment is arranged or arrangeable so as to be separable without tools.

It is proposed that a longitudinal extent of the household cleaning brush along a longitudinal center axis of the handle housing portion corresponds substantially to the extent, oriented at an obtuse angle thereto, of the household cleaning brush along the motor axis of rotation. This has the advantage that the household cleaning brush can be operated comfortably. A center of gravity position is favored as a result. It is possible to access confined points. The application of a force on the cleaning face of the brush, in particular substantially uniformly along an axis of rotation of the household cleaning brush, is improved. More uniform cleaning of a surface to be cleaned or the like is favored. The cleaning result is improved. Operation is more comfortable.

It is proposed that the longitudinal extent along a longitudinal center axis of the handle housing portion is determined from a rear free end of the handle housing portion to an opposite front side of the motor transmission housing portion, in particular wherein the front side of the motor transmission housing portion is oriented substantially parallel to the motor axis of rotation of the household cleaning brush.

It is proposed that the extent of the household cleaning brush along the motor axis of rotation is determined from a point, intersected by the motor axis of rotation, on the top side of the motor transmission housing portion to a free bristle end, intersected by the motor axis of rotation, of the cleaning brush, or is determined to an intersection point of the motor axis of rotation with an envelope surface which connects the free bristle ends of the household cleaning brush.

It is proposed that a center of gravity of the household cleaning brush, in particular in the case of a cleaning brush attachment received at the drive interface, comes to lie at least substantially in a transition region of the surfaces, facing one another at an obtuse angle, of the handle housing portion and of the motor transmission housing portion. In other words, outside the housing unit. In particular within a housing-free opening-angle pitch-circle segment between the surfaces of the handle housing portion and motor transmission housing portion. Advantageously with a radial spacing from an inflection point of less than one fifth, in particular less than one tenth of the longitudinal extent or extent of the (household) cleaning brush. The inflection point is defined here as being the intersection of the angle bisector of the obtuse angle between the surfaces of the handle housing portion and motor transmission housing portion and the surface of the housing unit. As a result, the household cleaning brush can be held very easily in the hand, regardless of whether it is used to clean horizontal or vertical surfaces. As a whole, at least only a small moment for orienting/stabilizing the household cleaning brush needs to be applied by a user's hand.

It is proposed that the charging interface for charging the rechargeable battery unit is in the form of a sealed micro- or type C USB charging interface, in particular for avoiding any ingress of water into the interior of the housing unit. In this way, no water can penetrate into the interior of the housing unit through the charging interface either. Similarly, dust protection or protection against other contaminants is ensured. This makes the household cleaning brush more robust and/or longer-lasting.

Furthermore, an abovementioned household cleaning brush is proposed, comprising a charging device for charging the rechargeable battery unit and/or comprising a multiplicity of cleaning attachments. Cleaning attachments may be in the form for example of pad holders with hook-and-loop fasteners, in particular in order to receive for example a cleaning pad, in particular a microfiber pad, advantageously a non-scouring microfiber pad. It is also possible for a kitchen pad, a scourer pad, in order to remove for example stubborn and/or burned-in stains, or a foam pad, in particular a melamine foam pad, or the like to be received.

An electric-motor-driven household cleaning brush or cleaning brush is proposed, having a housing unit for the in particular sealed accommodation of at least one drive unit, in particular of an electric motor, a transmission unit, an open-loop or closed-loop control unit and a rechargeable-battery unit. The housing unit has a handle housing portion accommodating the open-loop or closed-loop control unit and the rechargeable-battery unit, in particular having an actuating switch, arranged on a top side of the handle housing portion, for activating the household cleaning brush. It has preferably a charging interface, arranged on the underside of the handle housing portion, in particular in the region of a free end of the handle housing portion, for charging the rechargeable battery unit. Arranged at an obtuse angle to the handle housing portion is a motor transmission housing portion accommodating the drive unit and transmission unit, wherein the motor transmission housing portion receives, at its free end, an in particular sealed and rotatably mounted drive interface, on which a cleaning brush attachment is arranged or arrangeable so as to be separable without tools.

It is proposed that a longitudinal extent of the household cleaning brush along a longitudinal center axis of the handle housing portion corresponds substantially to the extent, oriented at an obtuse angle thereto, of the household cleaning brush along the motor axis of rotation. This has the advantage that the household cleaning brush can be operated comfortably. A center of gravity position is favored as a result. It is possible to access confined points. The application of a force on the cleaning face of the brush, in particular substantially uniformly along an axis of rotation of the household cleaning brush, is improved. More uniform cleaning of a surface to be cleaned or the like is favored. The cleaning result is improved. Operation is more comfortable.

It is proposed that the longitudinal extent along a longitudinal center axis of the handle housing portion is determined from a rear free end of the handle housing portion to an opposite front side of the motor transmission housing portion, in particular wherein the front side of the motor transmission housing portion is oriented substantially parallel to the motor axis of rotation of the household cleaning brush.

It is proposed that the extent of the household cleaning brush along the motor axis of rotation is determined from a point, intersected by the motor axis of rotation, on the top side of the motor transmission housing portion to a free bristle end, intersected by the motor axis of rotation, of the cleaning brush, or is determined to an intersection point of the motor axis of rotation with an envelope surface which connects the free bristle ends of the household cleaning brush.

It is proposed that a center of gravity of the household cleaning brush, in particular in the case of a cleaning brush attachment received at the drive interface, comes to lie at least substantially in a transition region of the surfaces, facing one another at an obtuse angle, of the handle housing portion and of the motor transmission housing portion. In other words, outside the housing unit. In particular within a housing-free opening-angle pitch-circle segment between the surfaces of the handle housing portion and motor transmission housing portion. Advantageously with a radial spacing from an inflection point of less than one fifth, in particular less than one tenth of the longitudinal extent or extent of the (household) cleaning brush. The inflection point is defined here as being the intersection of the angle bisector of the obtuse angle between the surfaces of the handle housing portion and motor transmission housing portion and the surface of the housing unit. As a result, the household cleaning brush can be held very easily in the hand, regardless of whether it is used to clean horizontal or vertical surfaces. As a whole, at least only a small moment for orienting/stabilizing the household cleaning brush needs to be applied by a user's hand.

It is proposed that the charging interface for charging the rechargeable battery unit is in the form of a sealed micro- or type C USB charging interface, in particular for avoiding any ingress of water into the interior of the housing unit. In this way, no water can penetrate into the interior of the housing unit through the charging interface either. Similarly, dust protection or protection against other contaminants is ensured. This makes the household cleaning brush more robust and/or longer-lasting.

Furthermore, an abovementioned household cleaning brush is proposed, comprising a charging device for charging the rechargeable battery unit and/or comprising a multiplicity of cleaning attachments. Cleaning attachments may be in the form for example of pad holders with hook-and-loop fasteners, in particular in order to receive for example a cleaning pad, in particular a microfiber pad, advantageously a non-scouring microfiber pad. It is also possible for a kitchen pad, a scourer pad, in order to remove for example stubborn and/or burned-in stains, or a foam pad, in particular a melamine foam pad, or the like to be received.

Also proposed is an interchangeable-tool machine interface for a cleaning brush or household cleaning brush, in particular for the tool-free connection of a drive unit, preferably a motor-driven cleaning-brush drive unit, to an output unit, preferably a cleaning-brush attachment, comprising a drive interface and output interface that are separable and connectable without tools and are separable or connectable in several discrete angular positions by axial displacement along a common axis of rotation, wherein the output interface has centering walls and resiliently displaceable latching-means walls, wherein the centering walls and the resiliently displaceable latching means walls are arranged so as to be angularly offset from one another in the circumferential direction about the axis of rotation. In particular, the output interface has in each case two, or a higher even number of, centering walls and resiliently displaceable latching-means walls. The centering walls and resiliently displaceable latching-means walls are advantageously formed separately from one another. In particular, the centering walls and resiliently displaceable latching-means walls are not connected together or are at least only partially connected together parallel to the direction of the axis of rotation, or in the circumferential direction. Advantageously, they are not connected on five sides and are connected together only via a sixth side on a basic body.

It is proposed that the drive interface has centering and mating latching-means walls that are arranged so as to be angularly offset from one another in the circumferential direction about the axis of rotation and, per wall, are designed to correspond both to the centering walls and to the latching-means walls of the output interface. In principle, it is conversely possible for the centering and mating latching-means walls to of course also be arranged on the output interface and for the centering walls and resiliently displaceable latching-means walls to also be arranged on the drive interface, and a person skilled in the art will likewise consider this to be covered by the disclosure by reversing the definition of the drive interface and output interface. The drive interface and output interface are intended to be connectable by latching and are provided for torque transmission. The latching connection is releasable in particular by exceeding a force threshold. The centering walls and the resiliently displaceable latching-means walls of the drive interface and the centering and mating latching-means walls of the output interface are advantageously formed in a substantially straight manner. Thus, the drive interface and output interface can be connected in at least twice as many angular positions as the output interface has resiliently displaceable latching-means walls. This increases comfort for the user. More intuitive use is allowed. Wearing down of the drive interface or wear to the drive interface and output interface is delayed, and a useful life of the tool changing interface is lengthened.

It is proposed that the centering walls, the resiliently displaceable latching-means walls, and the centering and mating latching-means walls are each in the form of wall pairs that are mirror-symmetric to one another. The centering walls, the resiliently displaceable latching-means walls, and the latching-means and mating latching-means walls thus each have an identical shape or geometry and are each arranged mirror-symmetrically to one another.

It is proposed that the centering walls of the output interface have a different shape or geometry than the resiliently displaceable latching-means walls of the output interface. As a result, the walls are each functionally optimized. In particular, the centering walls are designed for positioning the drive interface and/or for torque transmission to the drive interface. In particular, the resiliently displaceable latching-means walls are designed to latch with the drive interface.

It is proposed that all the centering and mating latching-means walls of the drive interface are designed for positioning, for torque transmission and for latching with the output interface. As a result, both centering walls and latching-means walls of the output interface can be received on a centering and mating latching-means wall. The coupling capability of the drive interface and output interface is increased, in particular doubled. It is proposed that all the centering and mating latching-means walls of the drive interface have the same shape or geometry and are arranged only in an angularly offset manner with respect to one another, in particular in an angularly offset manner at the same angle to one another, in particular centering and mating latching-means walls that are adjacent in the circumferential direction are at right angles to one another or an even angular fraction of 360°, i.e. in particular 90°, 60°, 45°, 36°, 30°, etc.

It is proposed that the order of rotational symmetry of the drive interface about its axis of rotation is at least twice the order of rotational symmetry of the output interface about its axis of rotation, in particular wherein the drive interface exhibits four-fold rotational symmetry and the output interface exhibits two-fold rotational symmetry. The order of rotational symmetry of the drive interface is advantageously an even multiple of the order of rotational symmetry of the output interface. In particular, the order of rotational symmetry of the drive interface is 4-, 6-, 8- or 10-fold. This allows the drive interface and output interface to be connected in 4, 6, 8 or 10 angular positions rather than for example only two angular positions when the order of rotational symmetry of the drive interface and output interface is identical. As a result, at the same time, a very secure hold and/or high-torque connection can be realized. The comfort for the user is increased.

It is proposed that the centering and latching-means walls of the output interface and the centering and mating latching-means walls of the drive interface are arranged at the same angle to one another in the circumferential direction, in particular at the same square, hexagonal, octagonal or even-polygonal angle. In other words, the centering walls are arranged at the same angle relative to the latching-means walls and the centering and mating latching-means walls are arranged at the same angle to one another, advantageously at right angles.

It is proposed that the output interface has, with regard to the axis of rotation, torque-transmission walls that are offset toward the inside or in particular toward the outside parallel to the centering walls. Inside or outside should be understood here as meaning in particular radially toward the inside or outside relative to the axis of rotation. Advantageously, as a result, a receiving gap for the centering and mating latching-means walls of the drive interface is provided. Advantageously, torque transmission takes place primarily between an outer face of the centering and mating latching-means walls of the drive interface and an inner face of the torque transmission walls of the output interface. Advantageously, centering and/or latching takes place primarily at or via an outer face of the latching-means walls of the output interface and an inner face of the centering and mating latching-means walls of the drive interface.

It is proposed that the axis of rotation extends along a section line of two planes of mirror symmetry oriented at right angles to one another, wherein the drive interface and output interface each have a first and, at right angles thereto, a second pair of mutually opposite walls that are arranged mirror-symmetrically to the first and second plane of mirror symmetry, respectively, in particular wall portions that protrude axially freely in the direction of the axis of rotation starting from a respective basic body of the drive interface and output interface. The pair of first wall portions and the pair of second wall portions or pairs of further wall portions of the drive interface and output interface are advantageously arranged at the same angle to one another in the circumferential direction. The pair of first wall portions and the pair of second wall portions or pairs of further wall portions of the drive interface have an identical shape, in particular are each designed for torque transmission and for latching with the output interface. The pair of first wall portions advantageously has a different shape than the pair of second wall portions or the pair of further wall portions of the output interface, being either designed for torque transmission or designed for latching with the drive interface. For the axial securing or latching of the drive interface and output interface, the drive interface has latching means, in particular latching recesses in the pairs of first and second or further wall portions and the output interface has a pair, in particular the second pair, of tab-like wall portions with mating latching means, in particular latching protrusions, preferably latching protrusions arranged at free ends of the tab-like wall portions. Advantageously, the drive interface or output interface, in particular the output interface, has at least a third pair of wall portions that are mirror-symmetrically opposite one another, this pair having, with regard to the axis of rotation, a parallel offset toward the inside or outside with respect to the wall portions of the first pair, in particular with the result that a receiving gap, in particular for the wall portions of the drive interface, arises between the parallel-offset first and third wall portions.

Also proposed is an attachment, in particular a cleaning-brush attachment, cleaning-sponge attachment, cleaning-sponge receptacle attachment or scourer attachment, having a drive interface or output interface as part of an abovementioned interchangeable-tool machine interface.

A hand-held power tool, in particular comprising a cleaning-brush drive unit and a cleaning-brush attachment, having an abovementioned interchangeable-tool machine interface is proposed.

Also proposed is an electric-motor-driven household cleaning brush (10), having a housing unit (12) for the in particular sealed accommodation of at least one drive unit (38), in particular of an electric motor (40), a transmission unit (42), an open-loop or closed-loop control unit (64) and a rechargeable-battery unit (66), characterized in that the housing unit (28) has a handle housing portion (72) accommodating the open-loop or closed-loop control unit (64) and the rechargeable-battery unit (66), and a motor transmission housing portion (78) at an obtuse angle (76) to the handle housing portion (72) and accommodating the drive unit (40) and transmission unit (42), wherein the motor transmission housing portion (78) receives, at its free end, an in particular sealed and rotatably mounted drive interface (24), on which a cleaning brush attachment (16) is arranged so as to be separable without tools.

It is proposed that a longitudinal extent (82) of the household cleaning brush (10) along a longitudinal center axis (84) of the handle housing portion (72) corresponds substantially to the extent (86), oriented at an obtuse angle (76) thereto, of the household cleaning brush (10) along the motor axis of rotation (46).

It is proposed that the longitudinal extent (82) along a longitudinal center axis (84) of the handle housing portion (72) is determined from a rear free end (88) of the handle housing portion (72) to an opposite front side (90) of the motor transmission housing portion (78), in particular wherein the front side (90) of the motor transmission housing portion (78) is oriented substantially parallel to the motor axis of rotation (46) of the household cleaning brush.

It is proposed that the extent (86) of the household cleaning brush along the motor axis of rotation (46) is determined from a point (92), intersected by the motor axis of rotation (46), on the top side of the motor transmission housing portion (78) to a free bristle end (94), intersected by the motor axis of rotation (46), of the cleaning brush (10), or is determined to an intersection point (98) of the motor axis of rotation (46) with an envelope surface (96) which connects the free bristle ends (94) of the household cleaning brush.

It is proposed that an actuating switch (70) for activating the household cleaning brush is arranged on a top side of the handle housing portion (72).

It is proposed that a charging interface (68) for charging the rechargeable battery unit (66) is arranged on an underside of the handle housing portion (72), in particular in the region or the vicinity of a free end (88) of the handle housing portion (72).

It is proposed that a center of gravity (100) of the household cleaning brush, in particular in the case of a cleaning brush attachment (16) received at the drive interface (24), comes to lie at least substantially in a transition region (104) of the surfaces (106, 108), facing one another at an obtuse angle, of the handle housing portion (72) and of the motor transmission housing portion (78), in particular within a housing-free opening-angle pitch-circle segment (110) between the surfaces (106, 108) of the handle housing portion (72) and motor transmission housing portion (78), advantageously with a radial spacing (112) from an inflection point (114) of less than one fifth, in particular less than one tenth of the longitudinal extent (82) or extent (86) of the household cleaning brush (12).

It is proposed that the charging interface (68) for charging the rechargeable battery unit (66) is in the form of a sealed micro- or type C USB charging interface (68), in particular for avoiding any ingress of water into the interior of the housing unit (28).

It is proposed that the household cleaning brush (12) comprises a charging device and/or a multiplicity of cleaning attachments (180).

It is proposed that the household cleaning brush (12) with an interchangeable-tool machine interface (14), in particular for the tool-free connection of a drive unit (38), preferably a motor-driven cleaning-brush drive unit (18), to an output unit (148), preferably a cleaning-brush attachment (16), comprising a drive interface (24) and output interface (22) that are separable and connectable without tools and are separable or connectable in several discrete angular positions by axial displacement along a common axis of rotation (46), wherein the output interface (22) has centering walls (150) and resiliently displaceable latching-means walls (152), wherein the centering walls (150) and the resiliently displaceable latching means walls (152) are arranged so as to be angularly offset from one another in the circumferential direction about the axis of rotation (46), wherein the drive interface (24) has centering and mating latching-means walls (158) that are arranged so as to be angularly offset from one another in the circumferential direction about the axis of rotation (46) and, per wall, are designed to correspond both to the centering walls (150) and to the latching means walls (152) of the output interface (22), and/or wherein the order of rotational symmetry of the drive interface (24) about its axis of rotation (46) is at least twice the order of rotational symmetry of the output interface (22) about its axis of rotation (46), in particular wherein the drive interface (24) exhibits four-fold rotational symmetry and the output interface (22) exhibits two-fold rotational symmetry.

BRIEF DESCRIPTION OF THE DRAWINGS

Further advantages will become apparent from the following description of the drawing. The drawing illustrates an exemplary embodiment of the disclosure. The drawing, the description and the claims contain numerous features in combination. A person skilled in the art will expediently also consider the features individually and combine them to form meaningful further combinations.

In the drawing.

DETAILED DESCRIPTION

Figure 1:
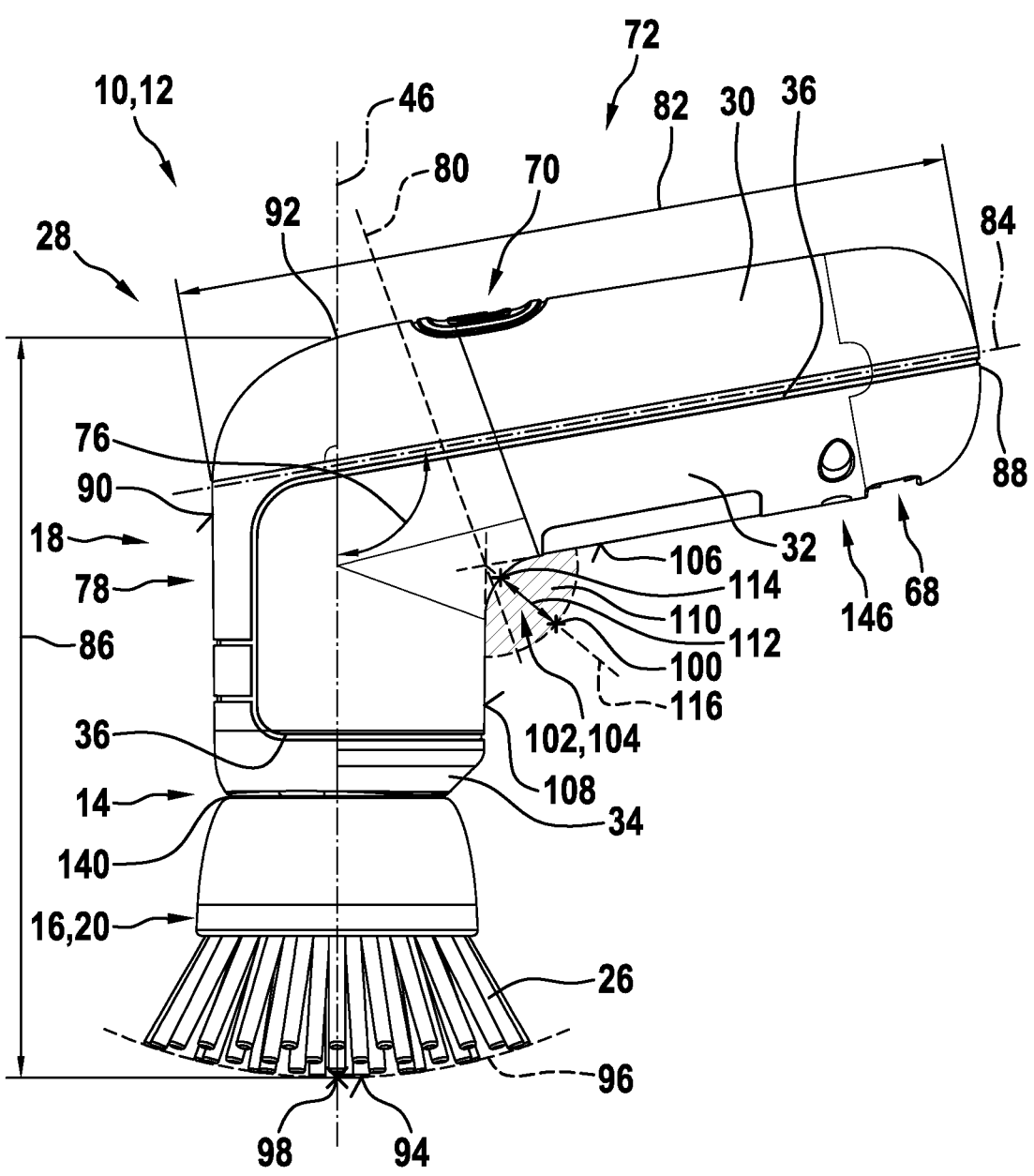
FIG. 1 shows a cleaning or household cleaning brush according to the disclosure in a side view.
Figure 2:
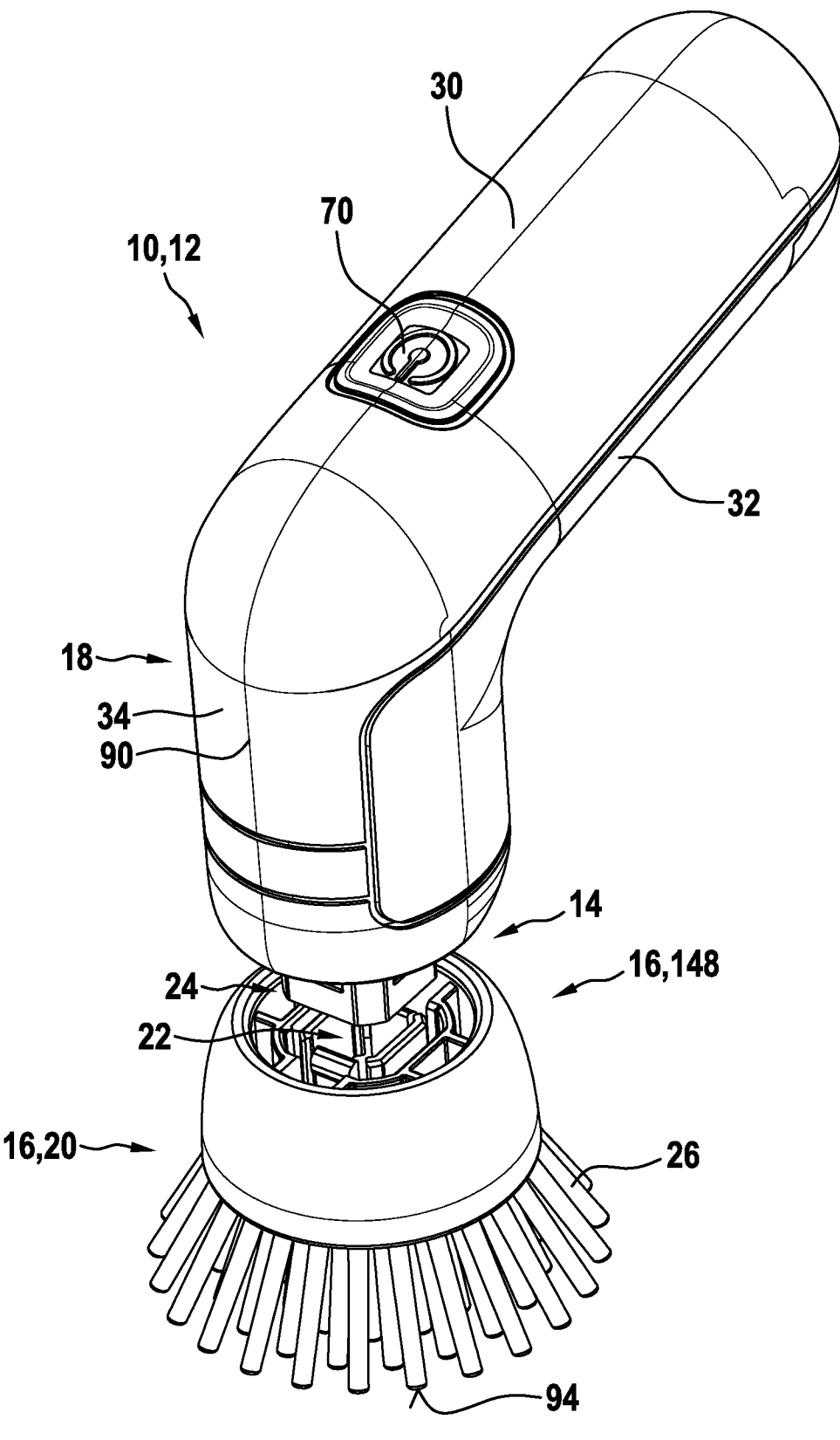
FIG. 2 shows the cleaning or household cleaning brush with a cleaning-brush attachment axially removed so as to make an interchangeable-tool machine interface visible, in a perspective view.
Figure 3A:
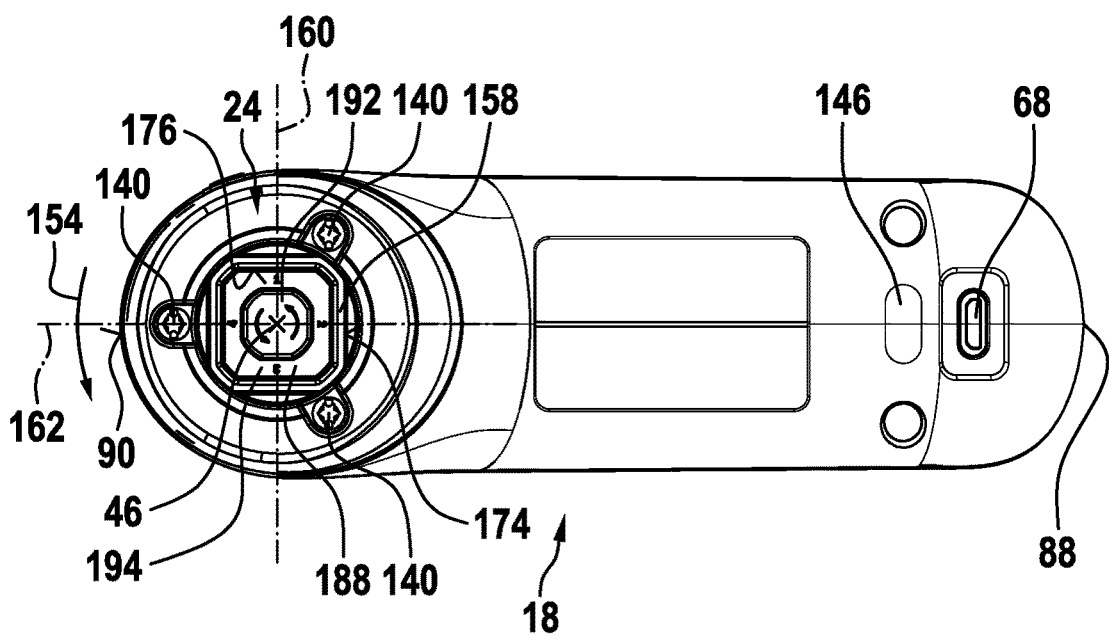
FIG. 3a shows the cleaning or household cleaning brush without a cleaning-brush attachment in a bottom view and a plan view of a drive interface.
Figure 3B:
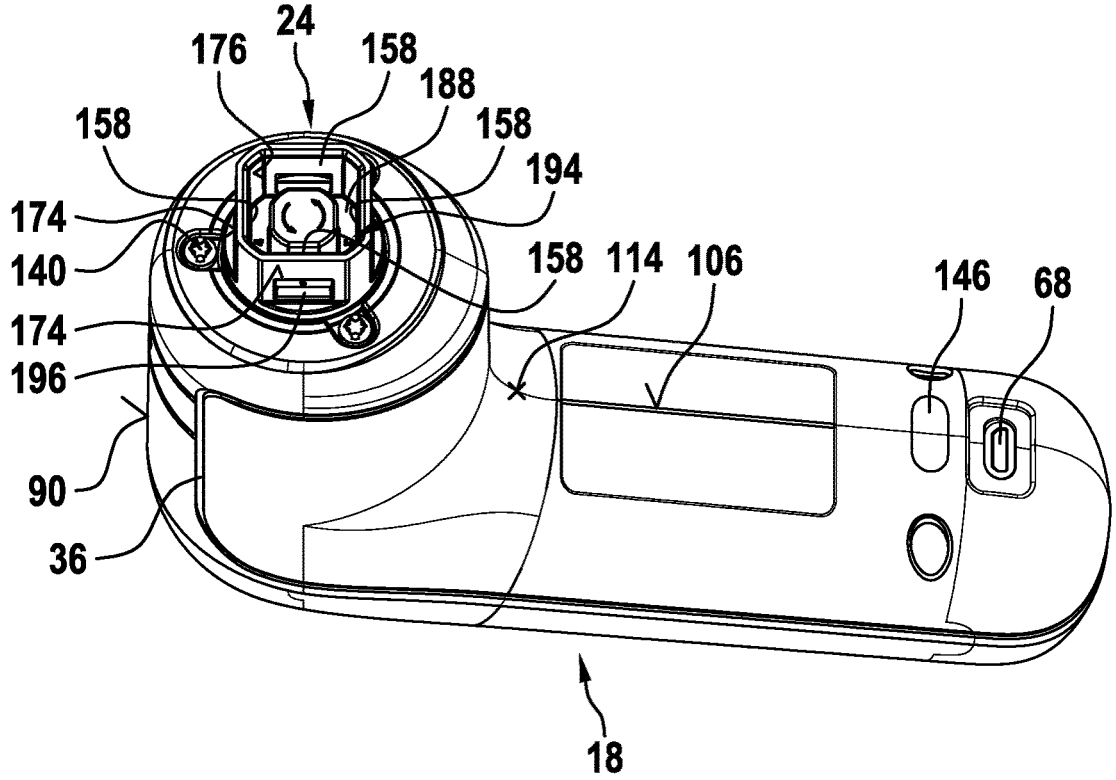
FIG. 3b shows the cleaning or household cleaning brush without a cleaning-brush attachment in a perspective view, and a perspective view of the drive interface.
Figure 4:
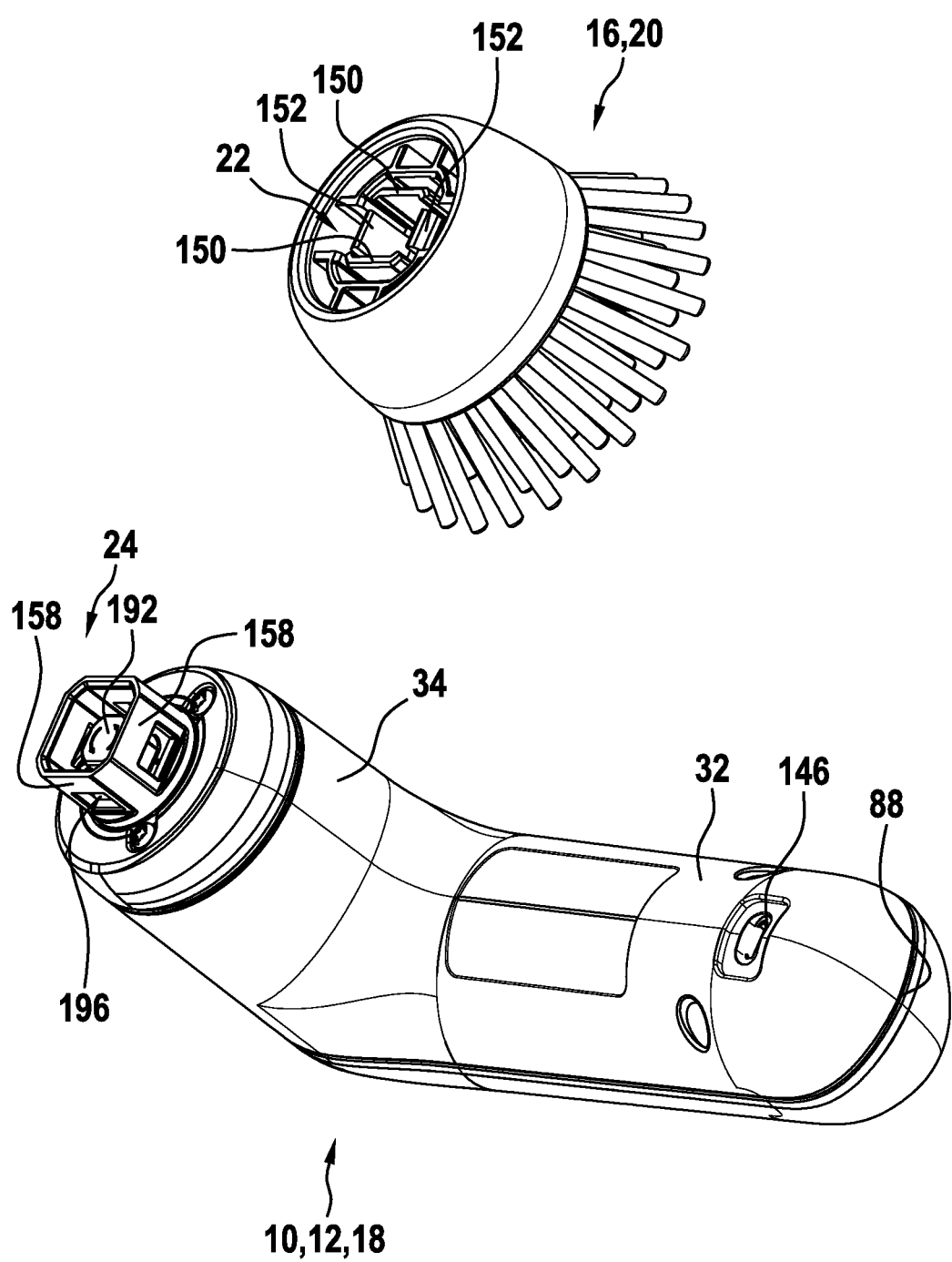
FIG. 4 shows the cleaning or household cleaning brush with a cleaning-brush attachment removed in a perspective view, and a perspective view of the drive interface and an output interface as parts of the interchangeable-tool machine interface.
Figure 5:
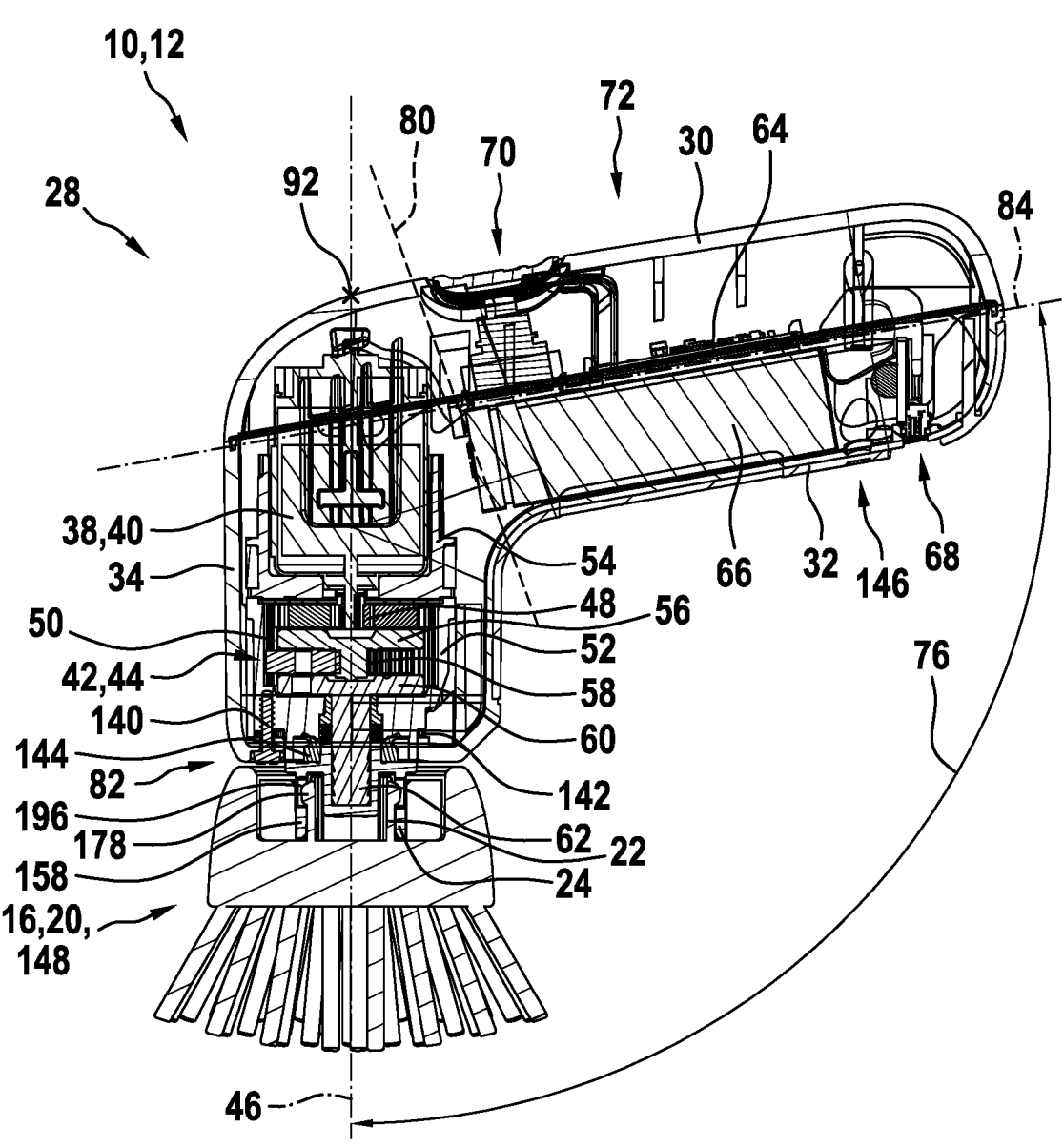
FIG. 5 shows the cleaning or household cleaning brush in a side sectional view.
Figure 6:
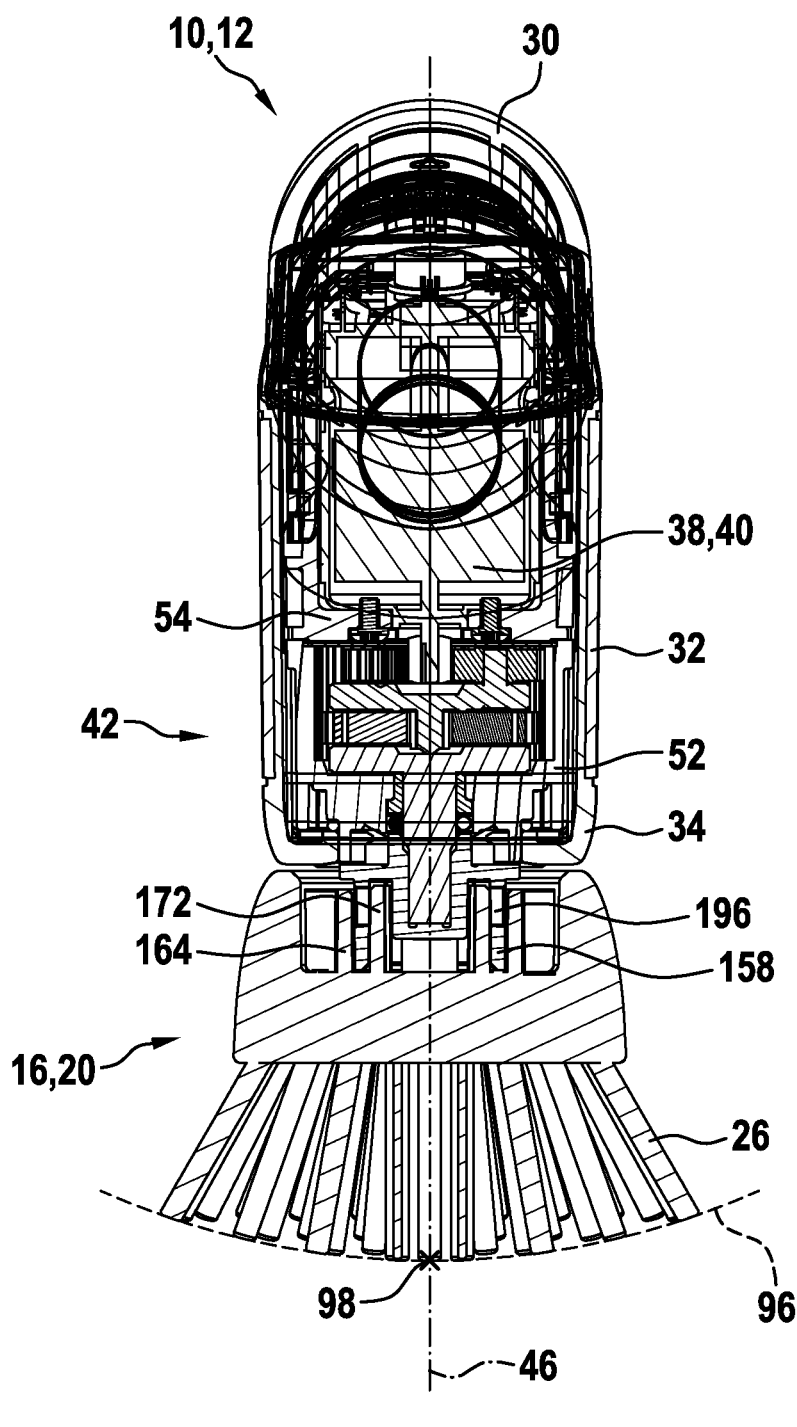
FIG. 6 shows the cleaning or household cleaning brush in a frontal sectional view, offset through 90° with respect to the sectional illustration in FIG. 5.
Figure 7A:
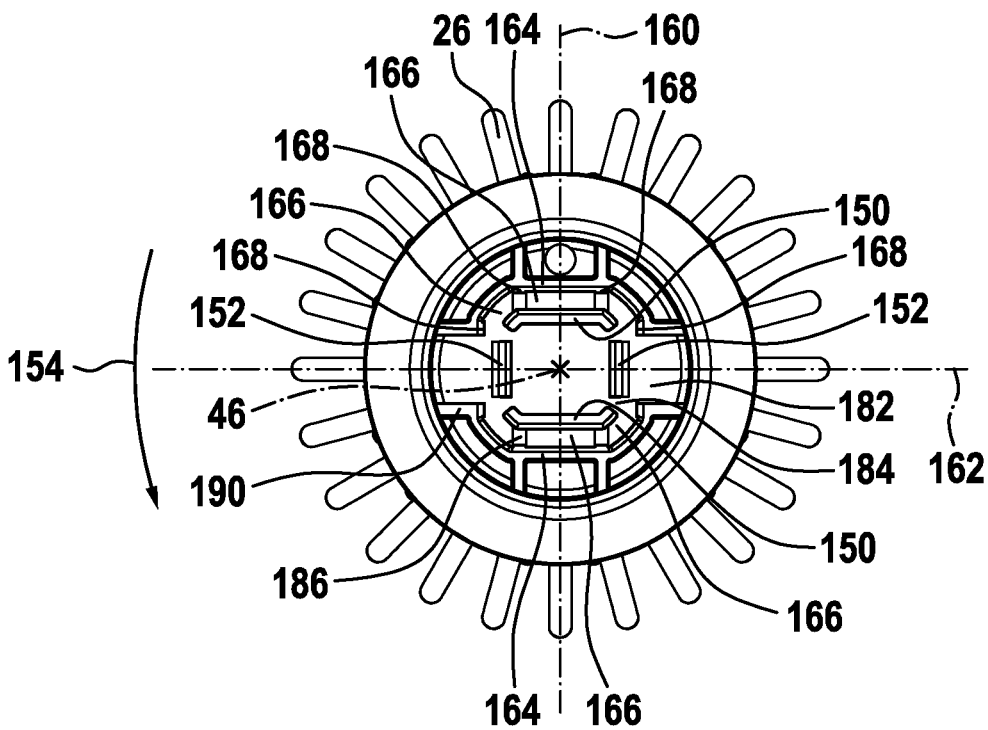
FIG. 7a shows the cleaning-brush attachment and the output interface in a plan view.
Figure 7B:
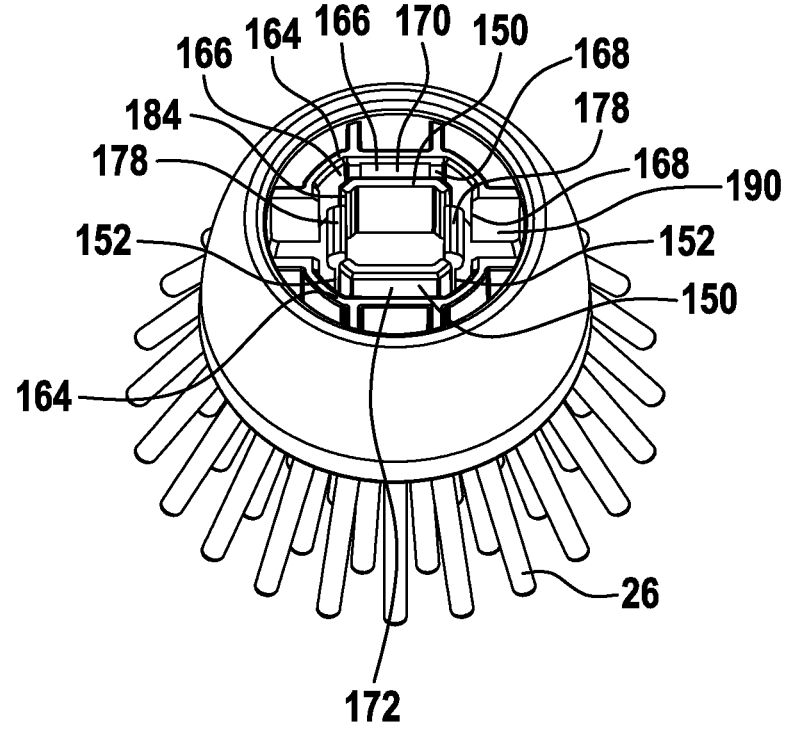
FIG. 7b shows the cleaning-brush attachment and the output interface in a perspective view.
Figure 8A:
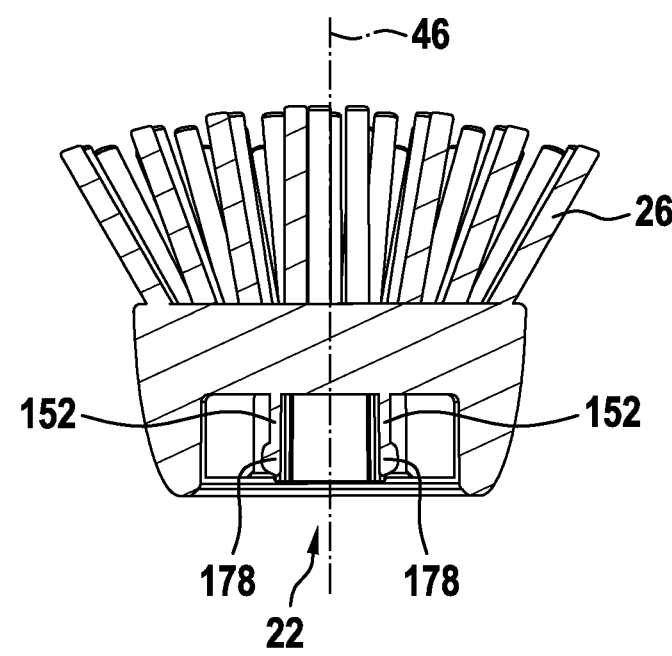
FIG. 8a shows the cleaning-brush attachment and the output interface in a first sectional illustration.
Figure 8B:
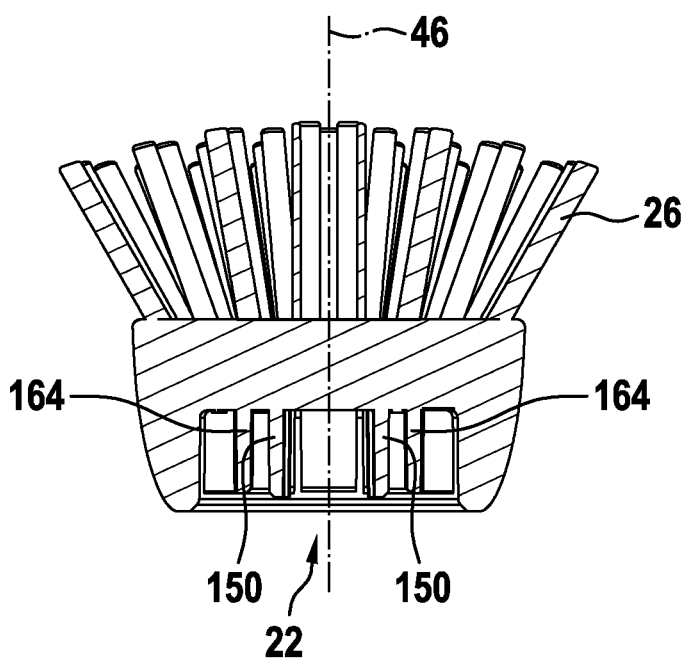
FIG. 8b shows the cleaning-brush attachment and the output interface in a second sectional illustration, offset through 90° with respect to the first sectional illustration according to FIG. 8a, FIG. 9 shows the cleaning-brush drive unit, with different attachments that can be fastened to the cleaning-brush drive unit so as to be separable without tools.

FIG. 1 shows a cleaning brush 10, or a household cleaning brush 12. It is an electric-motor-driven cleaning brush 10, as is apparent in particular from the sectional illustration, illustrating the inner components, in FIG. 5. Via a drive interface 24, a cleaning-brush attachment 16 with an output interface 22 is received. The drive interface 24 and output interface 22 form an interchangeable-tool machine interface 14, as is described in more detail below and is apparent from FIGS. 2 to 9. The cleaning brush 10 is intended to rotationally drive the cleaning brush attachment 16. According to FIG. 9, different attachments 180 can be fastened to the cleaning brush 10, or to the cleaning-brush drive unit 18, so as to be separable without tools. In particular a cleaning bristle brush 20 having a multiplicity of bristles 26. Or a detail brush 118, which is intended in particular for poorly accessible areas, advantageously having a basic body 120 which externally narrows substantially in the form of a truncated cone and on the narrow truncated end 124 of which cleaning bristles 122 are arranged on a comparatively small circular area, in particular in order for it to be possible to clean for example poorly accessible corners or narrow places, as occur for example at fitting bases or the like. Attachments 180 can also be in the form of pad holders 126 with hook-and-loop fasteners 128, in order to receive for example a cleaning pad 130, in particular a microfiber pad 132, advantageously a non-scouring microfiber pad 132. Sometimes, this is also intended for surfaces that are intended to be scrubbed but not scoured or scratches. It is also possible for a kitchen pad 134, a scourer pad 136, in order to remove for example stubborn and/or burned-in stains, or a foam pad 138, in particular a melamine foam pad, or the like to be received.

The cleaning brush 10 can be transported and used without a transport machine. Its weight is in particular less than 5 kg, advantageously less than 1 kg, in particular less than 0.5 kg. The cleaning brush 10 has a housing unit 28. The housing unit 28 is constructed from three housing parts 30, 32, 34, in particular a first advantageously upper housing part 30, a second advantageously lower housing part 32, and a third housing part 34. The housing parts 30, 32, 34 have a joint 36. The housing parts 30, 32, 34 are formed in a mutually sealing manner, and so as to seal the housing unit 28, in particular at least according to protection class IPX5. This provides the drivetrain components and electronic components with protection against spray water from all directions. According in particular to the sectional illustration according to FIG. 5, seals are provided between the housing parts 30, 32, 34 (this not being illustrated in more detail here). The housing unit 28 is intended to accommodate at least one drive unit 38, in particular an electric motor 40. The cleaning brush 10 has, or the housing unit 28 accommodates, a transmission unit 42. The transmission unit 42 is in particular in the form of a multistage planetary transmission 44 with a central drive and output. In other words, the drive and output are arranged along a common axis of rotation 46. The axis of rotation 46 is at the same time the axis of rotation 46 of the electric motor 40, and of the interchangeable-tool machine interface 14 and of the drive interface 24 and output interface 22 and of the attachment 180. The planetary transmission 44 is driven by the motor shaft of the electric motor 40 via the sun gear 48 of the first stage 48. The ring gear 50 of the first and second stage is fixed, advantageously formed in one piece with the transmission housing 52. The transmission housing 52 is advantageously connected to the motor accommodating housing 54 via screws and/or via a form-fit, force-fit and/or frictional fit. Advantageously, the unit made up of the drive unit 38 and transmission unit 42 is connected to the first housing part 30 by means of a form-fitting connection and to the second housing part via screws. The planetary carrier 56 of the transmission unit 42 of the first stage carries the sun gear 58 of the second transmission stage. The planetary carrier 60 of the second transmission stage is the central output of the planetary transmission 44. The transmission output drives the drive interface 24 of the cleaning brush 10. The drive interface 24 is connected to the transmission output shaft 62 via a frictional fit, force-fit and/or form-fit. Advantageously via screws 140 in the region of the region of the drive interface 24, the transmission housing 42 is connected, in particular screwed, to the housing unit 28. Since the transmission housing 52 also supports or accommodates the motor accommodating housing 54, the entire drivetrain of the cleaning brush 12 is connected advantageously very compactly to the housing unit 28. The housing unit 28 is sealed in the region of the rotary feedthrough of the drive interface 24 via at least one sealing ring 142, in particular an O-ring statically between the transmission housing 52 and third housing part 34 and via a radial shaft seal 144 dynamically for the rotational mounting of the drive interface 24.

The cleaning brush 10 has, or the housing unit 28 accommodates, an open-loop or closed-loop control unit 64. Furthermore, the cleaning brush 10 has, or the housing unit 28 accommodates, a rechargeable battery unit 66. The rechargeable battery unit 66 is rechargeable via a sealed charging interface 68, in particular a USB charging interface 68, preferably a USB mini-, micro- or type C charging interface 68. Next to the charging interface 68, a charge indicator 146 is likewise arranged on the underside of the housing unit 28. The cleaning brush 10 can be at least switched on and off via an actuating or switch unit 70, in this case in particular a microswitch, which is arranged advantageously under a soft component which has been sealingly injection molded in a recess in the housing unit 28.

The housing unit 28 has a handle housing portion 72 that accommodates the open-loop or closed-loop control unit 64 and the rechargeable battery unit 66. Arranged on a top side of the handle housing portion 72 is an actuating switch 74 of the actuating or switch unit 70 for activating the (household) cleaning brush 10. Arranged on an underside of the handle housing portion 72, in particular somewhat ahead of the free end 88, is the charging interface 68 for charging the rechargeable battery unit 66. The housing unit 28 has a motor transmission housing portion 78 formed at an obtuse angle 76 to the handle housing portion 72. The obtuse angle 76 is advantageously between 90-110°, in this case in particular around 100°. The motor transmission housing portion 78 accommodates the drive unit 38 and transmission unit 42. The handle housing portion 72 and motor transmission housing portion 78 are separated from one another approximately by the parting line 80 in particular for illustrative purposes.

The motor transmission housing portion 78 receives at its free end 88 a sealed and rotatably mounted drive interface 24, at which the cleaning-brush attachment 16 is able to be received, via its output interface 22, so as to be separable without tools.

A longitudinal extent 82 of the (household) cleaning brush 10, 12 along a longitudinal center axis 84 of the handle housing portion 72 corresponds substantially to the extent 86, oriented at an obtuse angle thereto, of the (household) cleaning brush along the (motor) axis of rotation 46.

The expression "corresponds substantially" should be understood in this connection in particular as meaning that a deviation of the longitudinal extent 82 from the extent 86 amounts to less than 20%, preferably less than 10% and particularly preferably less than 5%. The longitudinal extent 82 extends along the longitudinal center axis 84 of the handle housing portion 72 from a rear free end 88 of the handle housing portion 72 to an opposite front side 90 of the motor transmission housing portion 78. The front side 90 of the motor transmission housing portion 78 extends substantially parallel to the motor axis of rotation 46 of the household cleaning brush 10.

The extent 86 of the household cleaning brush 10 along the motor axis of rotation 46 extends from a point 92, intersected by the motor axis of rotation 46, on the top side of the motor transmission housing portion 78 to the point 98 of the free bristle end surface 94, intersected by the motor axis of rotation 46, or the envelope surface 96 that connects the free bristle ends.

A center of gravity 100 of the (household) cleaning brush 10, 12, in particular in the case with a cleaning-brush attachment 16 received at the drive interface 24, comes to lie at least substantially in the region of the in particular rounded bend 102 or in the transition region 104 of the surfaces 106, 108, facing one another at an obtuse angle, of the handle housing portion 72 and motor transmission housing portion 78. In particular within a housing-free opening-angle pitch-circle segment 110 between the surfaces 106, 108 of the handle housing portion 72 and motor transmission housing portion 78, advantageously with a radial spacing 112 from the inflection point 114 of less than one fifth, in particular less than one tenth of the longitudinal extent 82 or extent 86 of the (household) cleaning brush 10, 12. The inflection point 114 is in this case defined by the intersection point of the angle bisector 116 of the obtuse angle between the surfaces 106, 108 and the housing surface of the housing unit 28. It is advantageously at a spacing 112 of less than 20 mm, in particular around 5-15, advantageously around 10 mm, from the housing surface or the inflection point 114.

Furthermore, FIGS. 2 to 9 disclose at least parts of an interchangeable-tool machine interface 14 for a cleaning brush 10 or household cleaning brush 12. It is intended for the tool-free connection of a drive unit 38, preferably a motor-driven cleaning-brush drive unit 18, to an output unit 148, preferably a cleaning-brush attachment 16, 180. The interchangeable-tool machine interface 14 comprises a drive interface 24 and output interface 24 that are separable and connectable without tools. It is, or the drive interface 24 and output interface 22 are, separable or connectable in a plurality of discrete angular positions (in this case in four that are each offset through 90° with respect to one another) by axial displacement along a common axis of rotation 46. The output interface 22 (cf. in particular FIGS. 7a-8b) has in each case two centering walls 150 and two resiliently displaceable latching-means walls 152. The latching-means walls 152 have latching means, in particular latching-means protrusions 178, which protrude on the side facing away from the axes of rotation 46. They are provided for latching or at least clamping together with a mating latching means of the drive interface 24. The centering walls 150 and the resiliently displaceable latching-means walls 152 are arranged so as to be angularly offset from one another in the circumferential direction 154 about the axis of rotation 46, in this case angularly offset at right angles to one another. The drive interface 24 (cf. in particular FIGS. 3a-3b) has a plurality of (in this case four) centering and mating latching-means walls 158 which are arranged so as to be angularly offset from one another in the circumferential direction 154 about the axis of rotation 46 and which each take on the dual function or triple function of centering, mating latching and torque transmission. Per wall 158, they are designed to correspond both to the centering walls 150 and to the latching-means walls 152 of the output interface 22. In principle, the drive interface 24 and output interface 22 can of course also be arranged the other way around on the output unit and drive unit, respectively.

The centering walls 150 and the latching-means walls 152, formed separately therefrom, of the output interface 22, and the walls of the drive interface 24 that are formed functionally both as centering and as mating latching-means walls 158, are formed in pairs, as wall pairs that are mirror-symmetric to one another. Their shape or geometry is thus identical and mirrored at the plane of mirror symmetry. The axis of rotation 46 extends along a section line of two planes 160, 162 of mirror symmetry that are oriented at right angles to one another, wherein the drive interface 24 and output interface 22 each have a first and, at right angles thereto, a second pair of mutually opposite walls arranged mirror-symmetrically to the first and second plane of mirror symmetry 160, 162, respectively.

The centering walls 150 of the output interface 22 have a different shape than the resiliently displaceable latching-means walls 152 of the output interface 22. The centering walls 150 are designed for positioning the drive interface 24 and the resiliently displaceable latching-means walls 152 are designed for latching with the drive interface 24, such that at least axial removal is possible only with increased force application, or after overcoming a force threshold that is in particular much greater than a force for the sliding axial displacement of the drive interface 24 and output interface 22 in the connected but not yet latched state.

All the centering and mating latching-means walls 158 of the drive interface 24 are designed for position, for torque transmission and for latching with the output interface 22. They are straight or planar walls which are each arranged at right angles to one another.

The order of rotational symmetry of the drive interface 24 about the axis of rotation 46 is at least twice the order of rotational symmetry of the output interface 22 about the axis of rotation 46, and the order of rotational symmetry of the drive interface 24 is an even multiple of the order of rotational symmetry of the output interface 22. According to the exemplary embodiment, the drive interface 24 exhibits four-fold rotational symmetry and the output interface 22 exhibits two-fold rotational symmetry about the axis of rotation 46. As a result, the interchangeable-tool machine interface 14, or the drive interface 24 and output interface 22, can be connected in four angular positions, in particular in spite of the latching-means walls 152 that are arranged so as to be offset from one another through 90° in the circumferential direction and are formed separately from the centering walls 150, thereby significantly increasing user comfort. In addition, wear is reduced since, for torque transmission or latching over time (in the case of several random connections of the drive interface 24 and output interface 22), all four centering and mating latching-means walls 158 of the drive interface 24 are used.

The centering walls 150 and the latching-means walls 152 of the output interface 22 are, like the centering and mating latching-means walls 158 of the drive interface 24, arranged at the same angle to one another in the circumferential direction 154—in this case offset squarely or through 90° with respect to one another. Alternatively, they could also be arranged at the same hexagonal, octagonal or even-polygonal angle to one another.

The output interface 22 has, with regard to the axis of rotation 46, torque-transmission walls 164 that are offset toward the inside or the outside parallel to the centering walls 150. In particular, an offset or a spacing corresponds to the thickness of the centering and mating latching-means walls 158 of the drive interface 24 plus a clearance fit and optionally an oversize for possibly provided positioning or centering ribs 168. As a result, a receiving gap 166 for the wall portions or the centering and mating latching-means walls 158 of the drive interface 24 is provided between the centering walls 150 and torque transmission walls 164. Torque transmission takes place primarily, with regard to the axis of rotation 46, between the outer face 174 of the centering and mating latching-means walls 158 of the drive interface 24 and, with regard to the axis of rotation 46, the inner face 170 of the torque transmission walls 164 of the output interface 22, or between centering ribs 168 that are arranged on the torque transmission walls 164 and extend parallel to the axis of rotation 46. The centering ribs 168 protrude at least slightly into the receiving gap 166 or with respect to the adjacent centering wall 150. Centering and/or latching takes place, with regard to the axis of rotation 46, primarily at or via an outer face 172 of the walls or the centering walls 150 and the latching-means walls 152 of the output interface 22 and the inner faces 176 of the walls or centering and mating latching-means walls 158 of the drive interface 24.

The walls, in other words the centering or latching-means walls 150, 152 and the centering and mating latching-means walls 158, each extend substantially in a manner offset parallel to the planes 160, 162 of mirror symmetry. The walls each extend in the direction of the axis of rotation from a respective basic body 182, 188 of the drive interface 24 and output interface 22. On the basic body 182 of the output interface 22, it is possible for spacer ribs 186 that protrude axially at least slightly from the basic body 182 to be arranged in the region of the receiving gaps 166. As a result, the end faces of the walls of the drive interface 24, or of the centering and mating latching-means walls 158, do not axially strike the basic body 182 of the output interface. In addition, an axial position of the drive interface 24 and output interface 22 can be fixed in a manner defined thereby.

Between the centering and latching-means walls 150, 152 of the output interface 22, a respective slot 184 extends parallel to the direction of the axis of rotation. Thus, it is possible for the free ends of the latching-means walls 152 to pivot out transversely or radially to the axis of rotation 46 or in a tab-like manner and thus become latched with the mating latching means or release this latching again. The latching-means protrusions 178 are formed in a rounded manner axially at the ends in the direction of the axis of rotation 46 in order to allow in particular tool-free separation, merely through exceeding a force threshold. The walls of the drive interface and output interface each have, at their free ends or end faces, chamfers or bevels in order to facilitate easy, centering or guiding connection of the drive interface 24 and output interface 22. The torque transmission walls 164 of the output interface 22 are supported via ribs 190 with respect to a supporting wall that radially surrounds them. The ribs 190 extend perpendicularly or parallel to the planes 160, 162 of mirror symmetry. The centering walls 150 of the output interface 22 each angled toward the axis of rotation 46, laterally adjacent to the torque transmission walls 164. In each case at an angle of about 45°. The respectively angled piece has a width of 10-20%, advantageously around 15% of the width of the remaining torque transmission wall 164. The centering and mating latching-means walls 158 of the drive interface 24 are, by contrast, connected laterally via a corresponding angled wall piece, thereby increasing their strength and making them in particular stiff with regard to displacement radially or transversely to the axis of rotation 46. These workpiece are arranged at an angle of 45° with regard to the adjacent or circumferentially adjoining centering and mating latching-means walls 158. Centrally, the drive interface 24 has a dome 192 that protrudes along the axis of rotation from the basic body 188. Between the dome 192 and the centering and mating latching-means walls 158, there is formed a gap 194 in which the centering or latching-means walls 150, 152 come to lie during connection. The dome 192 can thus support or possibly center the inner faces of the centering or latching-means walls 150, 152 with regard to the axis of rotation 46. The faces of the dome 192 are oriented or arranged in a manner offset parallel to the faces of the centering and mating latching-means walls 158. The centering and mating latching-means walls 158 each have a recess 196 as mating latching means for the latching-means protrusions 178 of the output interface 22.

Figure 9:
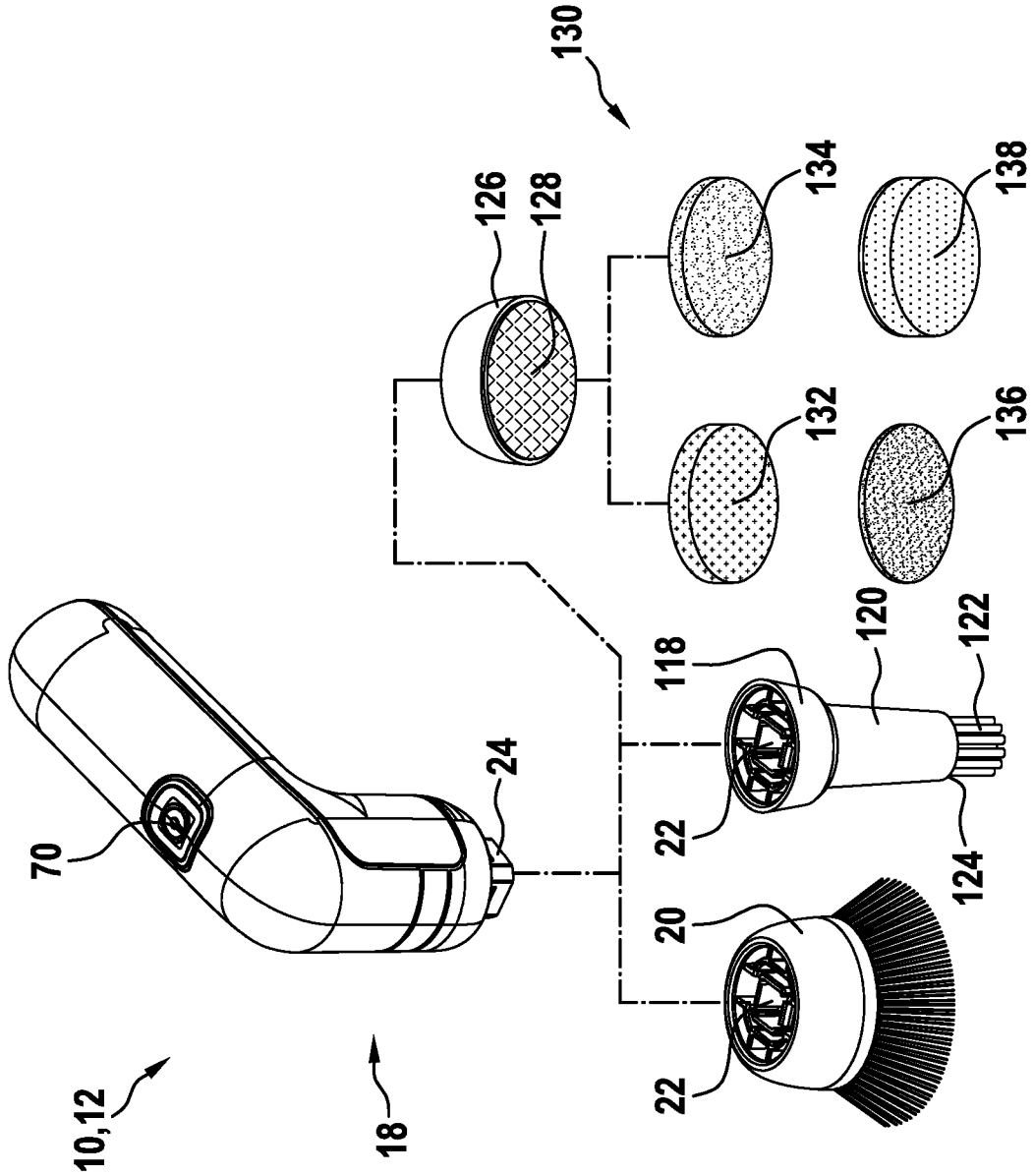

FIG. 9 shows, as described above, different attachments 180 for the cleaning or household cleaning brush 10, 12. They can be connected via their output interface 22 to the drive interface 24 of the cleaning or household cleaning brush 10, 12. The drive interface 24 and output interface 22 form the interchangeable-tool machine interface 14.

The invention claimed is:

1. An interchangeable-tool machine interface for a cleaning brush, comprising:

a drive interface; and an output interface, the drive interface and the output interface being separable and connectable without tools by axial displacement along a common axis of rotation, and the drive interface and the output interface being connectable in several discrete angular positions, wherein the output interface comprises:

a plurality of centering walls;

a plurality of resiliently displaceable latching walls, the plurality of centering walls and the plurality of resiliently displaceable latching walls arranged so as to be angularly offset from one another in a circumferential direction about the axis of rotation; and a plurality of torque-transmission walls that are radially parallel to and spaced apart radially from the plurality of centering walls and the plurality of latching walls, wherein the drive interface has a plurality of centering and mating latching walls that are arranged so as to be angularly offset from one another in the circumferential direction, the plurality of centering and mating latching walls configured to correspond both to the plurality of centering walls and to the plurality of latching walls of the output interface, and wherein, in a connected state of the drive interface and the output interface, each of the plurality of centering and mating latching walls is interposed between (i) an associated one of the plurality of torque-transmission walls and (ii) one of (a) an associated one of the plurality of centering walls or (b) an associated one of the plurality of latching walls.

2. The interchangeable-tool machine interface according to claim 1, wherein the plurality of centering walls, the plurality of resiliently displaceable latching walls, and the plurality of centering and mating latching walls are each in the form of wall pairs that are mirror-symmetric to one another.

3. The interchangeable-tool machine interface according to claim 1, wherein the plurality of centering walls have different shapes than the plurality of resiliently displaceable latching walls.

4. The interchangeable-tool machine interface according to claim 1, wherein all the plurality of centering and mating latching walls of the drive interface are designed for positioning, for torque transmission, and for latching with the output interface.

5. The interchangeable-tool machine interface according to claim 1, wherein an order of rotational symmetry of the drive interface about the axis of rotation is at least twice an order of rotational symmetry of the output interface about the axis of rotation.

6. The interchangeable-tool machine interface according to claim 5, wherein the drive interface exhibits four-fold rotational symmetry and the output interface exhibits two-fold rotational symmetry.

7. The interchangeable-tool machine interface according to claim 1, wherein, in the connected state, each of the plurality of centering and mating latching walls is arranged at the same angle in the circumferential direction as the associated one of the plurality of torque-transmission walls and the one of the (a) associated one of the plurality of centering walls or (b) the associated one of the plurality of latching walls.

8. The interchangeable-tool machine interface according to claim 7, wherein the plurality of centering walls and the plurality of resiliently displaceable latching walls of the output interface are oriented at the same square, hexagonal, octagonal, or even-polygonal angle as the plurality of centering and mating latching walls of the drive interface.

9. The interchangeable-tool machine interface according to claim 1, wherein:

the axis of rotation extends along a section line of two planes of mirror symmetry oriented at right angles to one another, the drive interface and the output interface each have a first and, at right angles thereto, a second pair of mutually opposite walls that are arranged mirror-symmetrically to the first and second plane of mirror symmetry, respectively.

10. The interchangeable-tool machine interface according to claim 9, wherein the first and second pairs of mutually opposite walls include wall portions that protrude axially freely in a direction of the axis of rotation starting from a respective basic body of the drive interface and the output interface.

11. The interchangeable-tool machine interface according to claim 1, wherein the interchangeable-tool machine interface is configured for tool-free connection of a motor-driven cleaning-brush drive unit to a cleaning-brush attachment.

12. An attachment comprising:

a drive interface or an output interface of an interchangeable-tool machine interface that comprises:

the drive interface; and the output interface, the drive interface and the output interface being separable and connectable without tools by axial displacement along a common axis of rotation, and the drive interface and the output interface being connectable in several discrete angular positions, wherein the output interface comprises:

a plurality of centering walls;

a plurality of resiliently displaceable latching walls, the plurality of centering walls and the plurality of resiliently displaceable latching walls arranged so as to be angularly offset from one another in a circumferential direction about the axis of rotation; and a plurality of torque-transmission walls that are radially parallel to and spaced apart radially from the plurality of centering walls and the plurality of latching walls, wherein the drive interface has a plurality of centering and mating latching walls that are arranged so as to be angularly offset from one another in the circumferential direction, the plurality of centering and mating latching walls configured to correspond both to the plurality of centering walls and to the plurality of latching walls of the output interface, and wherein, in a connected state of the drive interface and the output interface, each of the plurality of centering and mating latching walls is interposed between (i) an associated one of the plurality of torque-transmission walls and (ii) one of (a) an associated one of the plurality of centering walls or (b) an associated one of the plurality of latching walls.

13. The attachment according to claim 12, wherein the attachment is a cleaning-brush attachment, a cleaning-sponge attachment, a cleaning-sponge receptacle attachment, or a scourer attachment.

14. A cleaning brush or hand-held power tool, comprising:

a cleaning-brush drive unit;

a cleaning-brush attachment; and an interchangeable-tool machine interface comprising:

a drive interface operably connected to the cleaning-brush drive unit such that the drive interface is driven by the cleaning-brush drive unit; and an output interface operably connected to the cleaning-brush attachment so as to drive the cleaning-brush attachment, the drive interface and the output interface being separable and connectable without tools by axial displacement along a common axis of rotation, and the drive interface and the output interface being connectable in several discrete angular positions, wherein the output interface comprises:

a plurality of centering walls;

a plurality of resiliently displaceable latching walls, the plurality of centering walls and the plurality of resiliently displaceable latching walls arranged so as to be angularly offset from one another in a circumferential direction about the axis of rotation; and a plurality of torque-transmission walls that are radially parallel to and spaced apart radially from the plurality of centering walls and the plurality of latching walls, wherein the drive interface has a plurality of centering and mating latching walls that are arranged so as to be angularly offset from one another in the circumferential direction, the plurality of centering and mating latching walls configured to correspond both to the plurality of centering walls and to the plurality of latching walls of the output interface, and wherein, in a connected state of the drive interface and the output interface, each of the plurality of centering and mating latching walls is interposed between (i) an associated one of the plurality of torque-transmission walls and (ii) one of (a) an associated one of the plurality of centering walls or (b) an associated one of the plurality of latching walls.

\* \* \* \* \*